*US010021855B2*

United States Patent
Takagi et al.

(10) Patent No.: US 10,021,855 B2
(45) Date of Patent: Jul. 17, 2018

(54) TOILET FOR ANIMAL

(71) Applicant: UNICHARM CORPORATION, Ehime (JP)

(72) Inventors: Chiyo Takagi, Kagawa (JP); Shinya Kaneko, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 14/760,936

(22) PCT Filed: Mar. 9, 2015

(86) PCT No.: PCT/JP2015/056829
§ 371 (c)(1),
(2) Date: Jul. 14, 2015

(87) PCT Pub. No.: WO2016/139815
PCT Pub. Date: Sep. 9, 2016

(65) Prior Publication Data
US 2017/0367294 A1    Dec. 28, 2017

(30) Foreign Application Priority Data

Mar. 2, 2015    (JP) .................................. 2015-040209

(51) Int. Cl.
| A01K 1/01 | (2006.01) |
| A01K 29/00 | (2006.01) |
| A01K 1/015 | (2006.01) |

(52) U.S. Cl.
CPC .......... A01K 1/0107 (2013.01); A01K 1/0114 (2013.01); A01K 1/0151 (2013.01); A01K 1/0157 (2013.01)

(58) Field of Classification Search
CPC ........ A01K 1/0107; A01K 1/011; A01K 1/01; A01K 29/00; A01K 1/0114
(Continued)

(56) References Cited

U.S. PATENT DOCUMENTS 5,272,999 A * 12/1993 Nussle ................ A01K 1/0114
119/166
5,678,509 A * 10/1997 Dillon .................. A01K 1/0107
119/165
(Continued)

FOREIGN PATENT DOCUMENTS

| CN | 1891036 A | 1/2007 |
| CN | 101208492 A | 6/2008 |
(Continued)

OTHER PUBLICATIONS

JP2013-17446A Machine translation (Year: 2013).*
(Continued)

*Primary Examiner* — Son T Nguyen
(74) *Attorney, Agent, or Firm* — Brinks Gilson & Lione

(57) ABSTRACT

An animal toilet has a front-rear direction, a right-left direction and an up-down direction that intersect each other. The animal toilet is provided with an upper container that is provided with a plurality of holes through which urine passes below, a lower container that is positioned below the upper container and has formed an insert hole on a front face, and a tray that is housed from the insert hole into the lower container in a manner being allowed to be pulled out forward, and made to receive and store the urine that falls through the holes of the upper container. A front part of the tray is not protruding in front of the front face of the lower container when seen from the right-left direction. The front part of the tray has an exposed portion. An upside and a downside of the exposed portion are exposed to an outside space. An upper part and a lower part of the exposed portion are respectively provided with a geometrically deformed portion having a shape changed from a surrounding portion.

11 Claims, 11 Drawing Sheets

(58) Field of Classification Search
USPC .................................................. 119/165, 166
See application file for complete search history.

(56) References Cited

U.S. PATENT DOCUMENTS

| | | | | |
|---|---|---|---|---|
| 6,341,579 B1* | 1/2002 | Alkire | .................. | A01K 1/0107 119/165 |
| 6,523,495 B1* | 2/2003 | Rydman | ............... | A01K 1/0107 119/167 |
| 7,568,448 B2* | 8/2009 | Yamamoto | ........... | A01K 1/0114 119/166 |
| 8,327,802 B2* | 12/2012 | Matsuo | ................ | A01K 1/0114 119/166 |
| 9,737,045 B1* | 8/2017 | Scanlan | .................. | A01K 1/011 |
| 2005/0126504 A1* | 6/2005 | Strickland | ............ | A01K 1/0114 119/166 |
| 2009/0000556 A1 | 1/2009 | Matsuo et al. | | |
| 2009/0000558 A1 | 1/2009 | Matsuo et al. | | |

FOREIGN PATENT DOCUMENTS

| | | |
|---|---|---|
| CN | 101686648 A | 3/2010 |
| CN | 101686649 A | 3/2010 |
| CN | 101686651 A | 3/2010 |
| EP | 2 732 699 A1 | 5/2014 |
| JP | 2006-101890 A | 4/2006 |
| JP | 2012175910 A * | 9/2012 |
| JP | 2013-17446 A | 1/2013 |
| JP | 2014-195776 A | 10/2014 |
| JP | 2014-226106 A | 12/2014 |

OTHER PUBLICATIONS

International Search Report from corresponding PCT application on. PCT/JP2015/056829 dated May 19, 2015 (3 pgs) Priority Information: 0 This application claims priority under 35 Usc §120 to the following United States patent application(s): . In accordance with 37 Cfr §1.98(d), copies of the references cited herein which were.
Australian Examination Report No. 1 and Search Report from corresponding Australian application No. 2015384976 dated Aug. 1, 2017 (4 pgs).
International Preliminary Report on Patentability and Written Opinion from corresponding PCT application No. PCT/JP2015/056829 dated Sep. 5, 2017 (6 pgs).
European extended Search Report from corresponding European application No. 15883982.9 dated Jan. 24, 2018 (9 pgs).
Chinese Office Action from corresponding Chinese application No. 201580076309.1 dated May 2, 2018 (7 pgs).

* cited by examiner

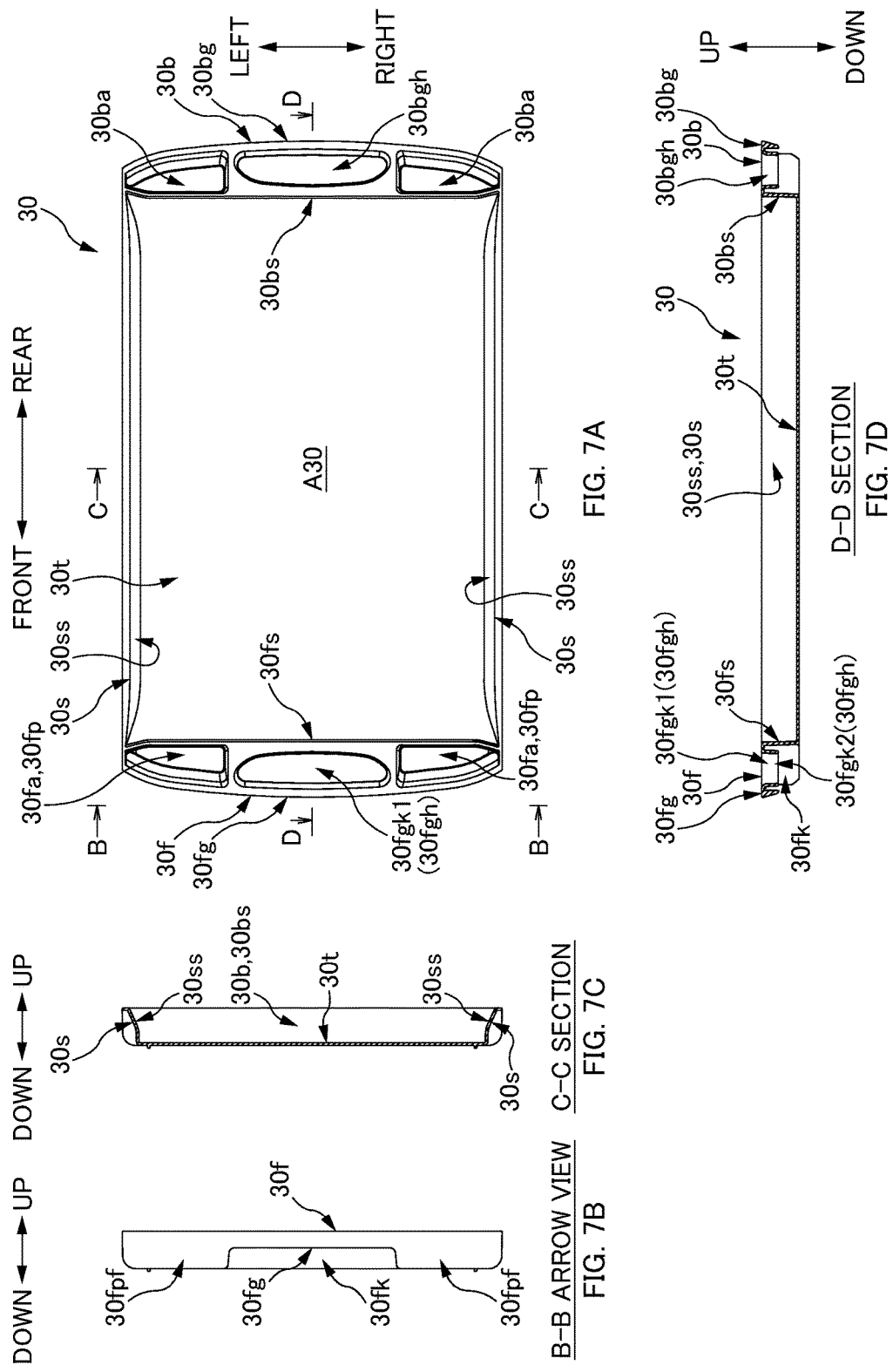

TOILET FOR ANIMAL

RELATED APPLICATION

The present application is a 35 U.S.C. § 371 national stage filing of International Patent Application No. PCT/JP2015/056829, filed Mar. 9, 2015, to which priority is claimed under 35 U.S.C. § 120 and through which priority is claimed under 35 U.S.C. § 119 to Japanese Priority Patent Application No. 2015-040209, filed Mar. 2, 2015.

TECHNICAL FIELD

The present invention relates to toilets for animals which are used by animals such as cats.

BACKGROUND ART

An animal toilet 101 which is used by animals such as cats is conventionally known. This animal toilet 101 includes, as illustrated in the schematic perspective view of FIG. 1A, the front-rear direction, the right-left direction and the up-down direction as the three directions which intersect each other. Further, this animal toilet 101 is provided with an upper container 110 which has provided a plurality of holes h, h . . . through which urine passes through below, a lower container 120 which is positioned below the upper container 110 and has formed an insert hole 120fh on the front face 120f, and a tray 130 which is housed in the lower container 120 from the above insert hole 120fh in a manner allowed to be pulled out forward and which receives and stores urine that has fallen through the above described holes h, h . . . of the upper container 110.

Note that, a handle part 130fg is formed to the front part 130f of the tray 130. Therefore, the tray 130 is pulled out forward by a worker such as the owner of the animal holding and pulling forward this handle part 130fg to change the used absorbent sheet (not shown) in this tray 130 to a new absorbent sheet.

PTL 1 discloses an example of this handle part 130fg. In other words, a depressed part 130fk is formed to the lower part on the front part 130f of the tray 130, and hereby the remaining part 130fg above the depressed part 130fk at the front part 130f is regarded as the handle part 130fg. And hereby the worker can easily catch this handle part 130fg from below with his/her hand reversed since the underside of the handle part 130fg is exposed to the outside space.

CITATION LIST

Patent Literature

[PTL 1] Japanese Laid-open Application No. 2013-17446

SUMMARY OF INVENTION

Technical Problem

The animal toilet 101 is often used by being placed on the floor of such as a room in a condominium. Therefore, when the worker tries to catch the handle part 130fg from below with his/her hand reversed, the worker needs to bend down low so that when the worker is aged and the like, in particular, a large burden would be imposed on the worker.

Meanwhile, if the front part 130 of the tray 130 were to be configured to protrude in front of the front face 120f of the lower container 120, as illustrated in the schematic perspective view of FIG. 1B, the worker could catch from above by an ordinary grip the engaging part 130fp above the handle part 130fg formed to the front part 130f of the tray 130. And hereby, the worker can pull out the tray 130 forward without bending down low.

However, with a configuration with the front part 130f of the tray 130 protruding toward the front as in the above manner, there is a possibility that this front part 130f would be in the way, for example, when an animal gets on the upper container 110 from the front side in order to use the animal toilet 101 or when the animal gets off the upper container 110 after use.

The present invention has been made in view of the above circumstances and an objective thereof is to allow the front part of the tray to be easily caught with the hand from either above or below so that the tray can be easily pulled out and prevent the front part of the tray from being in the way as well.

Solution to Problem

A main aspect of the invention for achieving the above objective is an animal toilet having a front-rear direction, a right-left direction and an up-down direction that intersect each other including, an upper container that is provided with a plurality of holes through which urine passes below, a lower container that is positioned below the upper container and has formed an insert hole on a front face, and a tray that is housed from the insert hole into the lower container in a manner being allowed to be pulled out forward, and made to receive and store the urine that falls through the holes of the upper container, a front part of the tray not protruding in front of the front face of the lower container when seen in the right-left direction, the front part of the tray having an exposed portion, an upside and a downside of the exposed portion being exposed to an outside space, and an upper part and a lower part of the exposed portion being respectively provided with a geometrically deformed portion having a shape changed from a surrounding portion.

Other features of the present invention will be made clear through the present specification with reference to the accompanying drawings.

Advantageous Effects of Invention

According to the present invention, the front part of the tray can be easily caught with the hand from either above or below so that the tray can be easily pulled out and the front part of the tray can be prevented from being in the way as well.

BRIEF DESCRIPTION OF THE DRAWINGS

FIG. 7A is a schematic planar view of a tray 30.

FIG. 7B is a schematic front view in the direction of the arrows B-B in FIG. 7A.

FIG. 7C is a cross-sectional view taken along line C-C at the approximate center of FIG. 7A.

FIG. 7D is a lengthwise sectional view taken along line D-D at the approximate center of FIG. 7A.

DESCRIPTION OF EMBODIMENTS

Figure 1A:
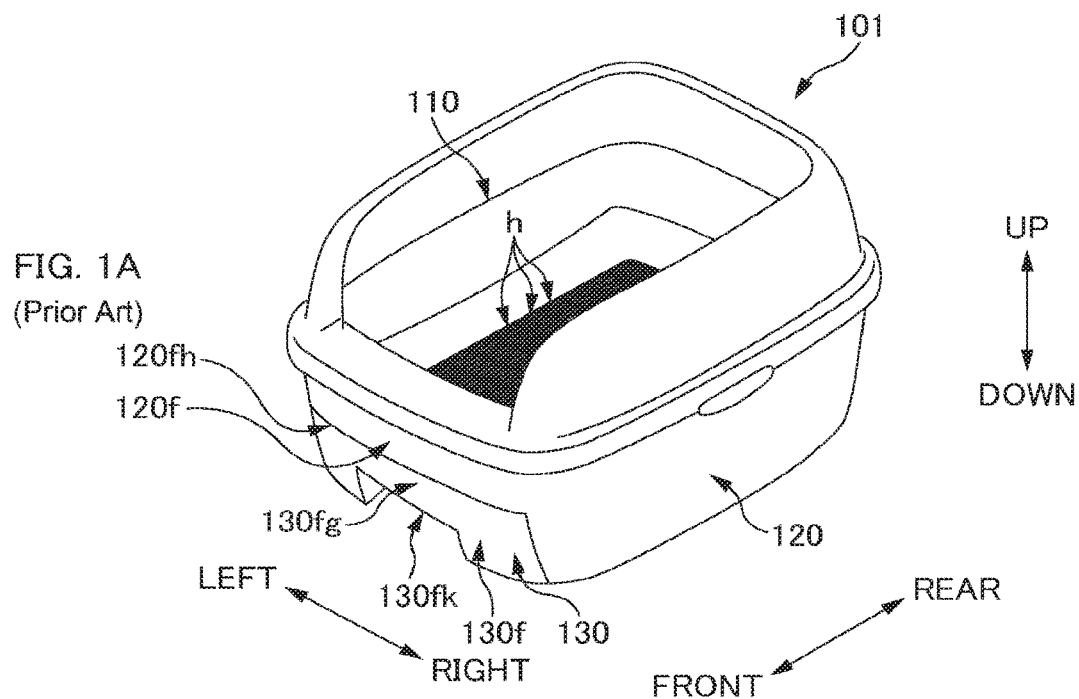
FIG. 1A is a schematic perspective view of an animal toilet 101.
Figure 1B:
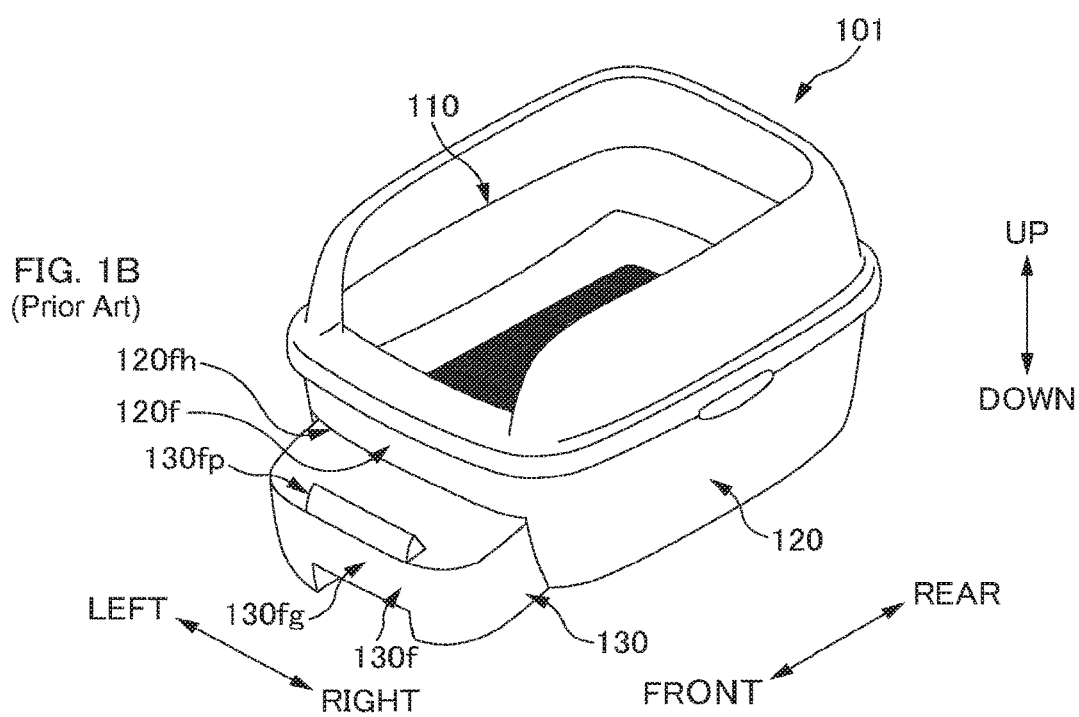
FIG. 1B is a schematic perspective view of an animal toilet 101 with a configuration where the front part 130f of the tray 130 protrudes in front of the front face 120f of the lower container 120.

At least the following matters will become clear through the description of the present specification and the accompanying drawings.

An animal toilet having a front-rear direction, a right-left direction and an up-down direction that intersect each other including, an upper container that is provided with a plurality of holes through which urine passes below, a lower container that is positioned below the upper container and has formed an insert hole on a front face, and a tray that is housed from the insert hole into the lower container in a manner being allowed to be pulled out forward, and made to receive and store the urine that falls through the holes of the upper container, a front part of the tray not protruding in front of the front face of the lower container when seen in the right-left direction, the front part of the tray having an exposed portion, an upside and a downside of the exposed portion being exposed to an outside space, and an upper part and a lower part of the exposed portion being respectively provided with a geometrically deformed portion having a shape changed from a surrounding portion.

According to such an animal toilet, the exposed portions at the front part of the tray is exposed above and below to the outside space and the upper part and the lower part of the exposed portion respectively has provided the above described geometrically deformed portion. Therefore, a worker can easily catch the front part of the tray from either above or below through the geometrically deformed portions so to thereby easily pull out the tray.

Further, when the animal toilet is viewed along the right-left direction, the front part of the tray does not protrude in front of the front face of the lower container. For this reason, the front part can be prevented from being in the way when, for example, an animal gets on the upper container from the front side to use the animal toilet or when the animal gets off the upper container after use.

It is preferable that in the animal toilet, the geometrically deformed portion of the upper part is a recessed part that is recessed downward and the geometrically deformed portion of the lower part is a recessed part that is recessed upward.

According to such an animal toilet, each of the geometrically deformed portions at the upper part and the lower part of the above described exposed portion is a recessed part. Therefore, a worker can further easily catch the front part of the tray with his/her hand.

It is preferable that in the animal toilet, the recessed part of the upper part and the recessed part of the lower part communicate with each other in the up-down direction to form a through hole.

According to such an animal toilet, the recessed parts of the upper and lower parts of the above described exposed portion form a penetration hole that communicates in the up-down direction. Therefore, a worker can firmly grasp the front part of the tray with his/her hand. And hereby, for example, even a tray that has gained its weight due to the stored urine can be certainly pulled out.

It is preferable that in the animal toilet, the front face of the lower container has formed a concave face concaved rearward adjacent above the insert hole.

According to such an animal toilet, the front face of the lower container would have the above described concave face formed to face the front part of the toilet from above. And hereby, the above described exposed portion at the front part is in a state exposed above to the outside space. And as a result, a worker can quickly catch with his/her hand from above the geometrically deformed portion at the upper part of the above described exposed portion through this concave face.

Further, the worker can easily recognize which of the front and the rear direction is the front side of the animal toilet by looking at the above described concave face.

It is preferable that in the animal toilet, a protruding face protruding rearward accompanied by the rearward concave deformation of the concave face is formed, to oppose a lower face of the upper container, at the rear of the concave face and the protruding face is positioned in front of all of the plurality of holes.

According to such an animal toilet, the above described protruding face of the lower container is located in front of all of the above described plurality of holes of the upper container. Therefore, the protruding face is effectively prevented from being getting filthy by the urine falling through the above described plurality of holes.

It is preferable that in the animal toilet, the tray has placed from above an absorbent sheet that receives and absorbs the urine that falls through the holes of the upper container, a protruding face protruding rearward accompanied by the rearward concave deformation of the concave face is formed, to oppose a lower face of the upper container, at the rear of the concave face, and the protruding face is positioned in front of a placing area of the absorbent sheet in the tray.

According to such an animal toilet, the tray has the above described absorbent sheet placed to receive the urine that falls through the above described holes of the upper container, and the above described protruding face is located in front of the placing area of the above described absorbent sheet. Therefore, the above described protruding face is effectively prevented from getting filthy by the urine falling through the above described plurality of holes.

It is preferable that in the animal toilet, the tray has placed from above an absorbent sheet that receives and absorbs the urine that falls through the holes of the upper container, and portions in front of the placing area of the absorbent sheet in the tray and on two sides on a right and a left of the geometrically deformed portion, respectively have a space partitioned and surrounded by wall parts in four directions of a front, a rear, a right and a left.

According to such an animal toilet, the front face of the portions on both the right and left sides of the geometrically deformed portion at the front part of the tray can be quickly avoided from being in a shape sinking toward the rear by partitioning the above described space. And hereby, dust that may be accumulated on the floor and the like of a condominium where the animal toilet is placed can be effectively avoided when the front face of the portions on the above two sides are in concave shapes.

It is preferable that in the animal toilet, the space being surrounded by a wall part from also below is a space with a bottom and has only an upper side opened.

According to such an animal toilet, the above described space is surrounded by wall parts from not only the front, the rear, the right and the left sides but from also the bottom side and hereby this space is that having a bottom that can store matters coming in from above. Therefore, even when the urine stored in the absorbent sheet on the tray were to flow out toward the front by the momentum of the tray being pulled out forward, the urine can flow into the space to be temporarily stored so that the urine can be restrained from leaking out to the front side of the tray.

It is preferable that in the animal toilet, the space with the bottom is positioned in the lower container when the tray is in a state housed in the lower container and the space with the bottom contains a fragrant or a deodorizer.

According to such an animal toilet, the above space with a bottom containing a fragrant or a deodorant is located inside the lower container when the tray is in a housed state. Therefore, the odor coming from urine stored in the tray inside the lower container can be restrained by quickly deodorizing inside the lower container.

It is preferable that in the animal toilet, a protruding face protruding rearward accompanied by the rearward concave deformation of the concave face is formed, to oppose a lower face of the upper container, at the rear of the concave face, the upper container is placed and supported on the lower container in an appropriate placing state where the upper container does not come into contact with the protruding face, when the upper container is placed in an orderly direction along the front-rear direction, and the upper container positioned above the appropriate placing state is in an inappropriate placing state when the upper container is positioned in a direction opposite the orderly direction with regard to the front-rear direction by the upper container coming into contact with the protruding face of the lower container.

According to such an animal toilet, a foolproof function can be provided to prevent the upper container from being mistakenly placed to the lower container in the opposite direction along the front-rear direction. In other words, even if the upper container were placed reverse the above described orderly direction with regard to the front-rear direction, the upper container would come into contact with the above described protruding face of the lower container so to thereby place the upper container in a state higher than the above described appropriate placing state. Therefore, a worker that has seen this can quickly recognize that the upper container is placed in the opposite direction by mistake.

It is preferable that in the animal toilet, a front side of the upper container is an entrance/exit opening for an animal to go into/come out from the upper container, a plurality of particulate matters are placed on a bottom face of the upper container, a protruding face protruding rearward accompanied by the rearward concave deformation of the concave face is formed at the rear of the concave face, a portion positioned above the protruding face of the upper container includes a part with a level difference on an upper face, two portions positioned different from each other in the up-down direction are adjacent in the front-rear direction via the part with the level difference, a front portion among the two portions is positioned above a rear portion in the up-down direction, and the front portion does not have the particulate matters placed.

According to such an animal toilet, the above described front portion can be made to function as the so-called "shakeout". In other words, the above described particulate matters are placed on the bottom face of the upper container and the above described particulate matters or their fragments may stick on the foot of the animal when the animal that has passed urine in the animal toilet comes out from the animal toilet through the front part of the toilet as the entrance/exit. And in this case, when the animal comes out of the animal toilet with the particulate matters stuck on its foot, the animal may spoil the surroundings such as the floor of the room where the animal toilet is placed. However with regard to this, the particulate matters on the foot can be quickly taken off while the animal that has urinated walks on the above front portion of the above upper container according to the above described configuration. Therefore, the front portion can be made to function as a shakeout.

===Present Embodiment===

Figure 2:
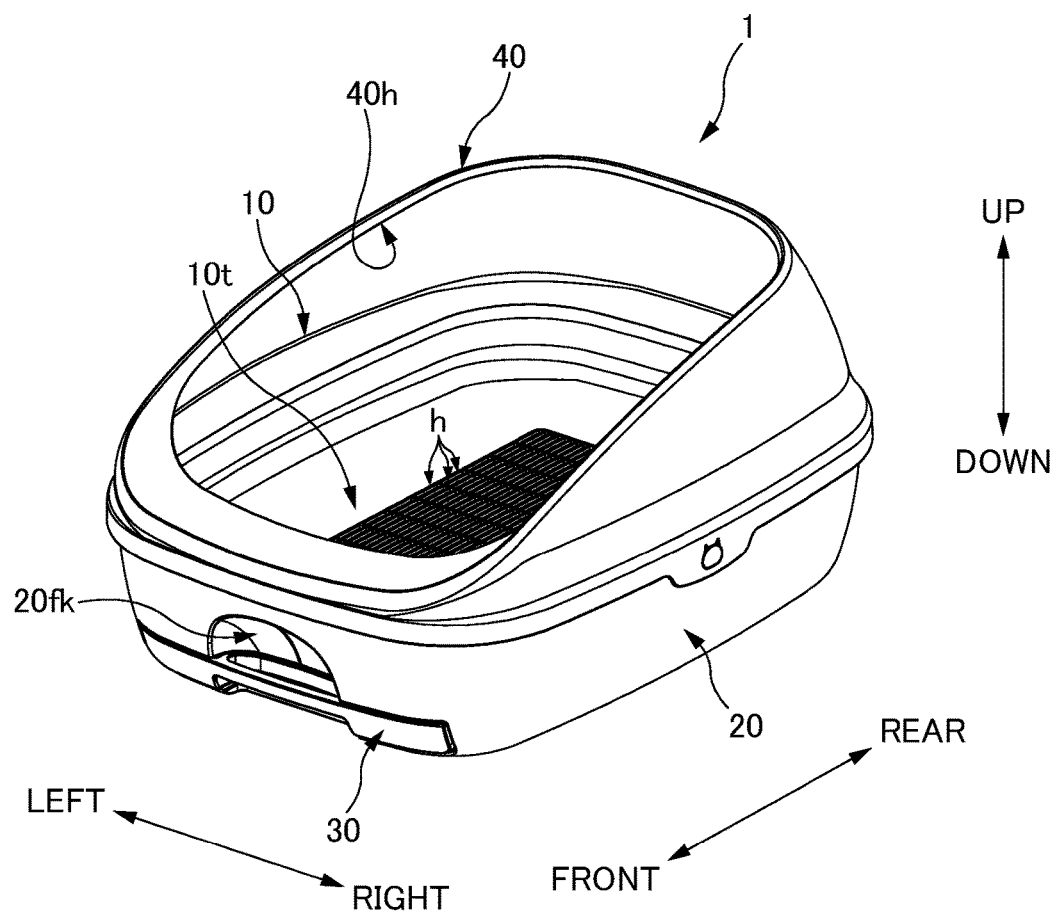
FIG. 2 is a schematic perspective view of an animal toilet 1 of one embodiment of the present invention.
Figure 3:
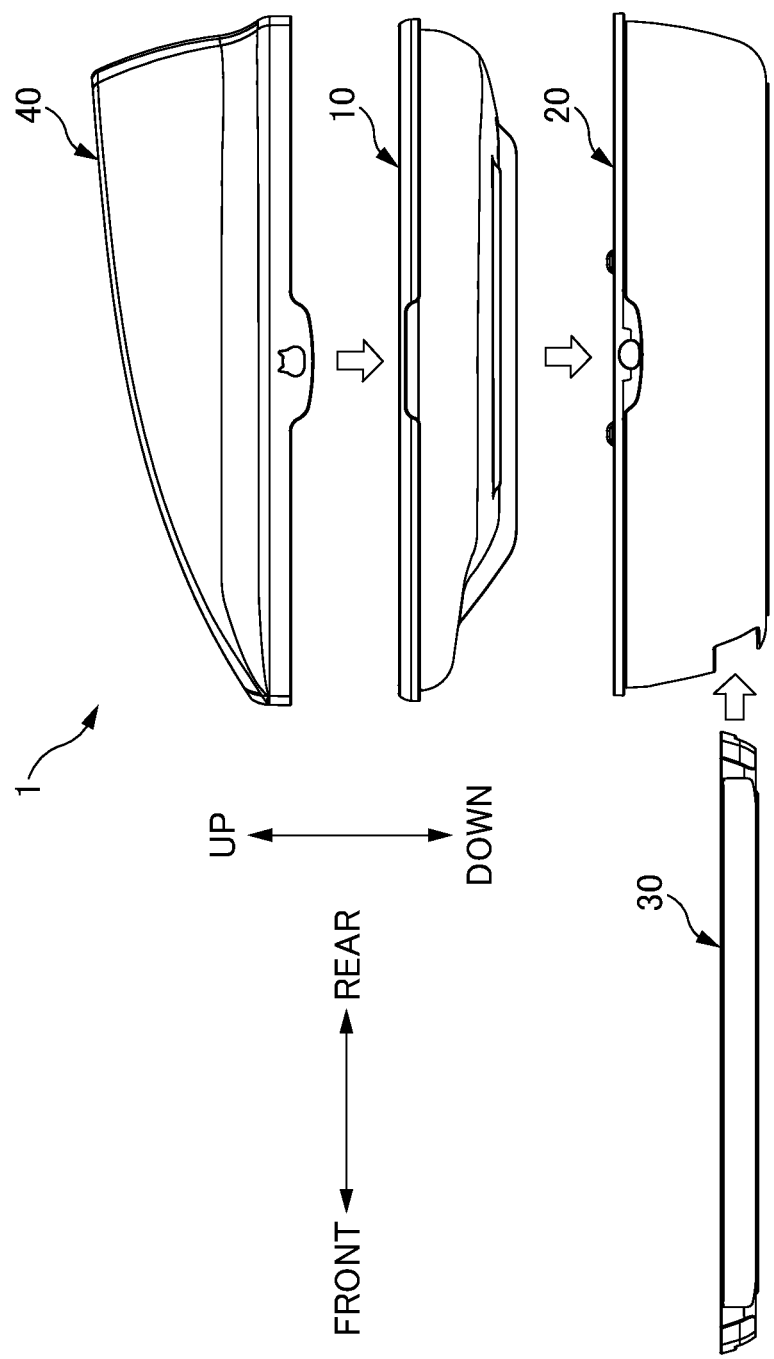
FIG. 3 is a schematic exploded side view of the animal toilet 1 of one embodiment of the present invention.

FIG. 2 is a schematic perspective view of the animal toilet 1 according to the present embodiment. FIG. 3 is a schematic exploded side view of the same animal toilet 1. Note that in the following description, the three directions that intersect each other are called the front-rear direction, the right-left direction and the up-down direction.

As illustrated in FIGS. 2 and 3, this animal toilet 1 is provided with an upper container 10, a lower container 20 placed under the upper container 10, a tray 30 which is housed in the lower container 20 in a manner allowed to be forwardly pulled out and a cover 40 placed over the upper container 10. And the bottom face part 10t of the upper container 10 has formed a plurality of through holes h, h . . . penetrating in the up-down direction and has placed particulate matters (not shown) such as cat litter on the bottom face part 10t as well.

Therefore, when an animal such as a cat gets on the particulate matters on the bottom face part 10t of the upper container 10 from the entrance/exit opening part 40h of the cover 40 and urinates, the urine falls through the spaces between the particulate matters and the above described through holes h, h . . . to be received by the tray 30 below so that the urine is stored in the tray 30.

Note that, this tray 30 may have placed thereon an absorbent sheet (not shown) that absorbs liquid, for example, in a substantially rectangular planar shape so that the urine is absorbed and certainly retained.

Description of the upper container 10, the lower container 20 and the tray 30 will be given in the following.

Figure 4:
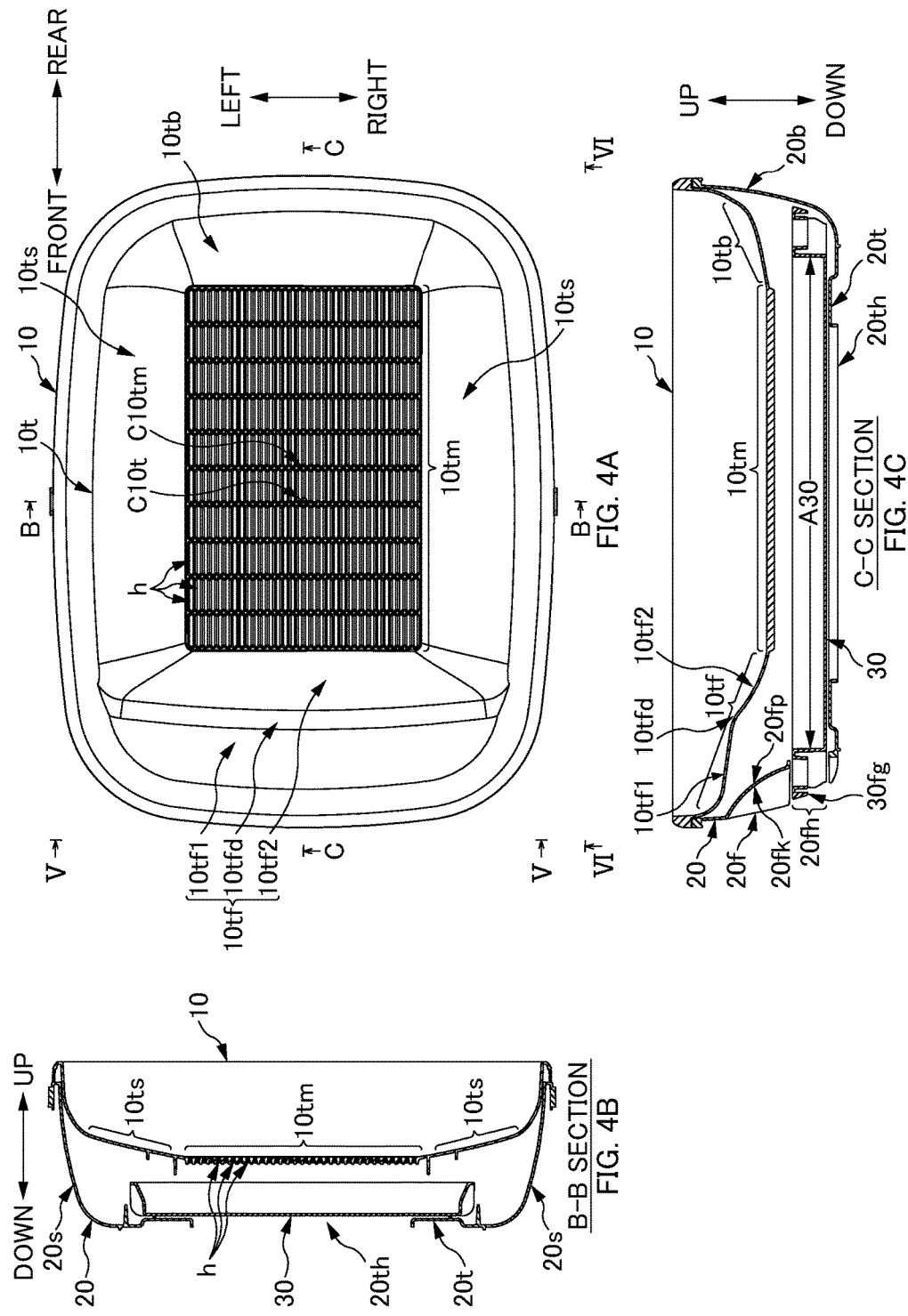
FIG. 4A is a schematic planar view with a cover 40 taken off from the animal toilet 1.
FIG. 4B is a cross-sectional view taken along line B-B at the approximate center of FIG. 4A.
FIG. 4C is a lengthwise sectional view taken along line C-C at the approximate center of FIG. 4A.

FIG. 4A is a schematic planar view with the cover 40 taken off from the animal toilet 1, FIG. 4B is a cross-sectional view taken along line B-B at the approximate center of FIG. 4A, and FIG. 4C is a lengthwise sectional view taken along line C-C at the approximate center of FIG. 4A. Additionally, FIG. 5 is a schematic front view in the direction of the arrows V-V in FIG. 4A and FIG. 6 is a schematic side view in the direction of the arrows VI-VI in FIG. 4A.

The upper container 10 is for example a container which has a bottom but does not have a lid and the shape of the bottom face part 10t is in a substantially bowl form with the height of a predetermined area 10tm including the plane center position C10t thereof being low and the four surrounding areas 10tf, 10tb, 10ts, 10ts of the predetermined area 10tm being high. And the top face of this predetermined area 10tm is formed substantially flat and this area 10tm has the above described plurality of through holes h, h . . . each formed in oblong forms so that this predetermined area 10tm is made a mesh area 10tm allowing urine to pass through downward. By the way, in this example, the plane center position 10tm of the mesh area 10tm is shifted rearward with regard to the plane center position C10t of the bottom face part 10t of the upper container 10 and this mesh area 10tm of a low height basically has the above described particulate matters such as cat litter dispersedly placed, however, it is not limited to such.

The lower container 20 is also, for example, a container which has a bottom but does not have a lid. In other words, as illustrated in FIGS. 4B and 4C, this lower container 20 includes a front wall part 20f, a rear wall part 20b, right and left side wall parts 20s, 20s and a bottom face part 20t, and the front wall part 20f, the rear wall part 20b and the right and left side wall parts 20s, 20s are respectively arranged vertically upward from the front end edge, the rear end edge and the right and left side end edges of the bottom face part 20t. However in this example, the bottom face part 20t has a large substantially rectangular opening part 20th formed to penetrate in the up-down direction from the viewpoint of weight reduction, material cost reduction and the like, and hereby this lower container 20 is virtually a container without a bottom, however, it is not limited to such.

Figure 5:
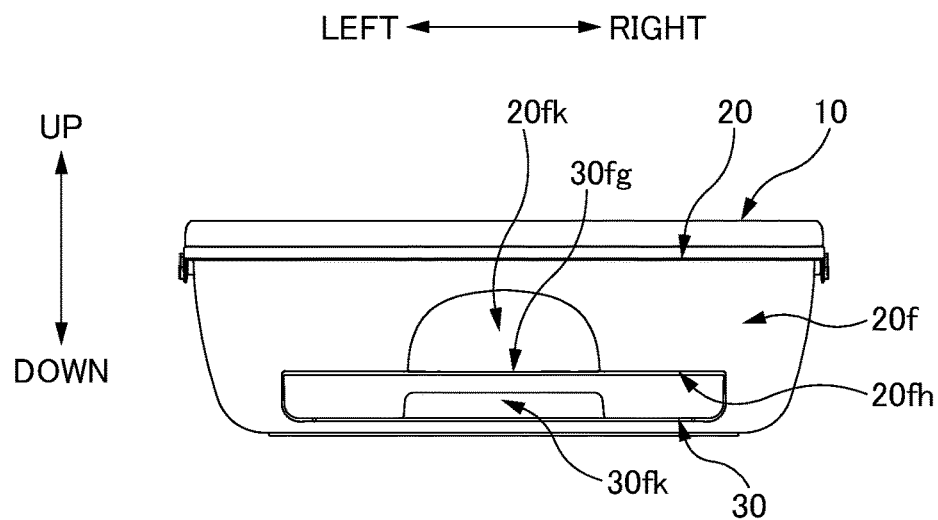
FIG. 5 is a schematic front view in the direction of the arrows V-V in FIG. 4A.
Figure 6:
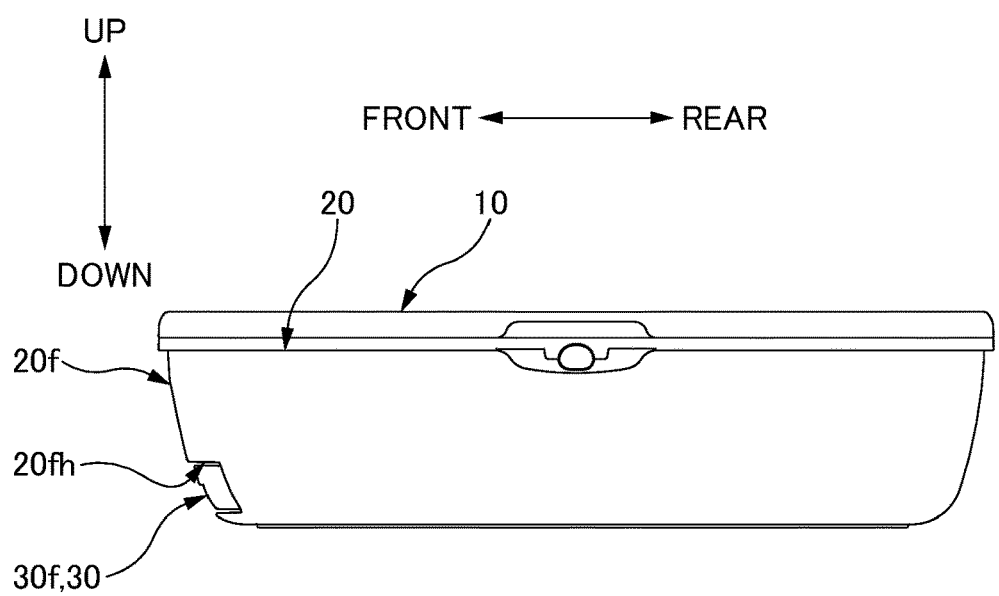
FIG. 6 is a schematic side view in the direction of the arrows VI-VI in FIG. 4A.

Further, as illustrated in FIGS. 4C and 5, the above described front wall part 20f which forms the front face of the lower container 20, has a horizontally long insert hole 20fh formed to penetrate in the front-rear direction. And as illustrated in FIG. 6, this insert hole 20fh has the above described tray 30 inserted from the front side and hereby the tray 30 is housed inside the lower container 20 in a manner allowed to be pulled out forward from the lower container 20.

Note that, as illustrated in FIGS. 4C and 5, the front wall part 20f has formed a concave face 20fk concaved rearward adjacent above the insert hole 20fh, which will be described later.

Figure 8A:
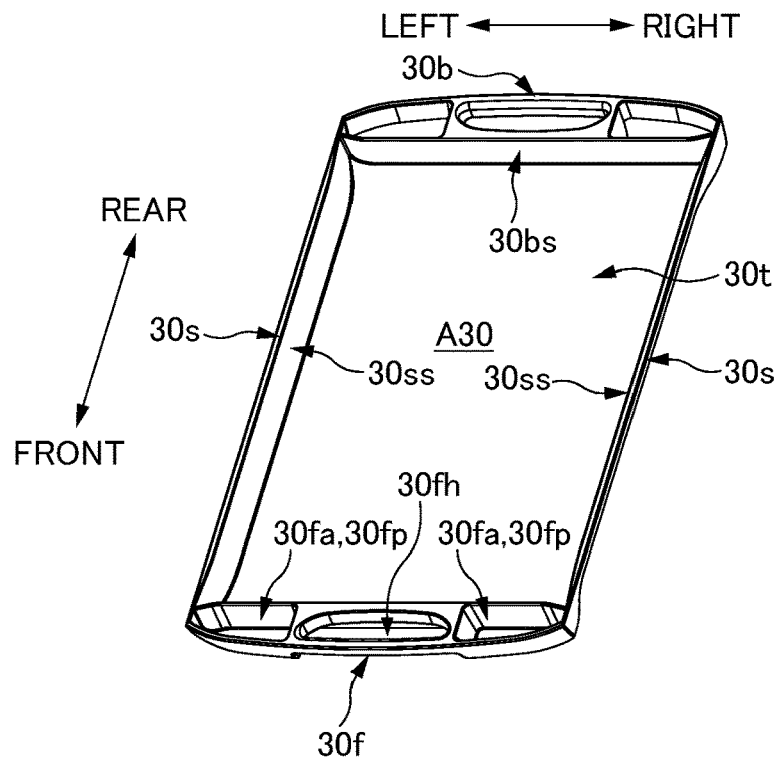
FIG. 8A is a schematic perspective view of the tray 30 seen from the top face side.
Figure 8B:
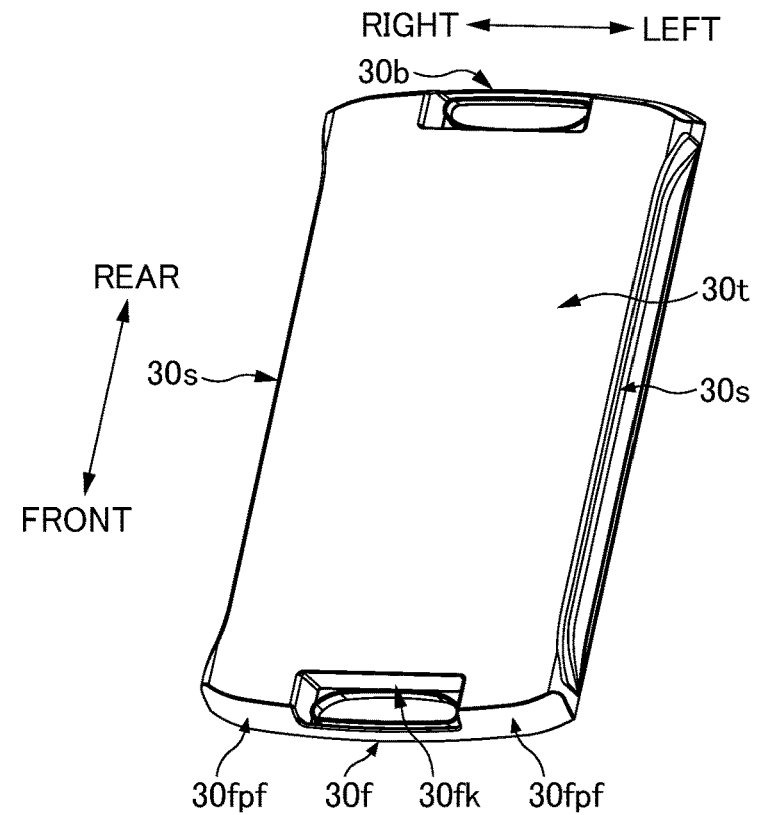
FIG. 8B is a schematic perspective view of the tray 30 seen from the bottom face side.

FIG. 7A is a schematic planar view of a tray 30. FIG. 7B is a schematic front view in the direction of the arrows B-B in FIG. 7A, FIG. 7C is a cross-sectional view taken along line C-C at the approximate center of FIG. 7A, and FIG. 7D is a lengthwise sectional view taken along line D-D at the approximate center of FIG. 7A. Additionally, FIG. 8A is a schematic perspective view of the tray 30 seen from the top face side and FIG. 8B is a schematic perspective view of the tray 30 seen from the bottom face side.

As illustrated in FIGS. 7A to 7D and FIG. 8A, the tray 30 is, for example, a shallow flat container which has a bottom but does not have a lid. In other words, the tray 30 includes a horizontally long front wall part 30f, a horizontally long rear wall part 30b, lengthwise right and left side wall parts 30s, 30s and a bottom face part 30t which is substantially rectangular in a planar view, and the front wall part 30f, rear wall part 30b and the right and left side wall parts 30s, 30s are respectively arranged vertically upward from the front end edge, the rear end edge and the right and left side end edges of the bottom face part 30t. And when the aforementioned absorbent sheet is used, the absorbent sheet is placed at a placing area A30 which is in an area at or inside the inner wall face 30fs of the front wall part 30f, the inner wall face 30bs of the rear wall part 30b, and the inner wall faces 30ss of the right and left side wall parts 30s.

Here, as illustrated in the schematic side view of FIG. 6, when viewing the lower container 20 housing the tray 30 from the right-left direction (along the right-left direction), the above described front wall part 30f that forms the front part of the tray 30 is prevented from protruding in front of the front wall part 20f of the lower container 20. To be specific, when viewing the lower container 20 in the right-left direction in this example, the front wall part 30f of the tray 30 is slightly withdrawn in the rear direction compared to the front wall part 20f of the lower container 20. Therefore, the front wall part 30f of the tray would not be in the way when an animal gets on the upper container 10 from the front side in order to use the animal toilet 1 or when the animal gets off the upper container 1 after use.

Further, as illustrated in FIGS. 7A, 7B and 7D, the front wall part 30f of the tray 30 has a handle part 30fg formed for grasping when pulling the tray 30 out from the lower container 20. And this handle part 30fg is enabled to be caught by the hand from both directions above and below.

In other words, firstly as illustrated in FIGS. 7B and 7D, the lower part of the front wall part 30f has formed a recessed part 30fk which is horizontally long when viewed from the front and recessed rearward, and the portion 30fg (corresponding to the exposed portion) remaining above this recessed part 30fk has the lower part exposed to the outside space. Therefore, a worker can quickly catch and grasp this portion 30fg from below with his/her hand reversed. Further, as previously described with reference to FIGS. 4C and 5, the front wall part 20f of the lower container 20 has formed a concave face 20fk concaved rearward adjacent above the insert hole 20fh. Therefore, the above described remaining portion 30fg also has the upper side exposed to the outside space and hereby a worker can quickly catch and grasp with a normal grip this portion 30fg from above with his/her hand. And from the above, this portion 30fg can function as a handle part 30fg which can be caught and grasped by the hand from both above and below. This portion 30fg will be called the "handle part 30fg" in the following.

Here as illustrated in FIGS. 7A and 7D, the upper part of this handle part 30fg has formed a recessed part 30fgk1 downwardly recessed as an example of the geometrically deformed portion which has a shape different from the surrounding portions, and as illustrated in FIG. 7D, a lower part of this handle part 30fg also has formed a recessed part 30fgk2 upwardly recessed as an example of the geometrically deformed portion. And these recessed parts 30fgk1, 30fgk2 communicate with each other in the up-down direction forming a through hole 30fgh. Thus a worker can further tightly grasp the handle part 30*fg* so to thereby allow a certain pulling out of the tray 30 that has gained its weight with the urine stored.

However, this geometrically deformed portion is not limited to the above described through hole 30*fgh*. In other words, the recessed part 30*fgk*1 at the upper part and the recessed part 30*fgk*2 at the lower part of the handle part 30*fg* need not be in communication with each other and further, the geometrically deformed portion need not be a recessed part and can be a projecting part.

Meanwhile as illustrated in FIGS. 7A and 8A, each of the parts 30*fp*, 30*fp* on both the right and the left sides of the above described through hole 30*fgh* at the front wall part 30*f* of the tray 30 respectively have formed downward facing holes 30*fa*, 30*fa* with bottom faces. In other words, this portion 30*fp* has sectioned a space 30*fa* with a bottom and surrounded with wall parts from not only the four sides on the front, the rear, the right and the left, but also from the bottom side. Therefore, the front faces 30*fpf*, 30*fpf* (see FIG. 7B and FIG. 8B) of the portions 30*fp*, 30*fp* on the two sides can be quickly prevented from being in a rearward recessed form. And as a result, accumulation of dust which may occur on the floor and the like of the condominium on which the animal tray 1 is placed when in the above described shape, can be effectively prevented.

Note that this space 30*fa* with a bottom is opened in the upward direction so that matters coming from above can be stored. And this space 30*fa* is located in front of the above described placing area A30 of the absorbent sheet. Therefore, the urine can be quickly flown into the above described space 30*fa* to be temporarily stored even when the urine stored in the absorbent sheet on the tray 30 were to flow out toward the front by the momentum of the tray 30 being pulled out forward from the lower container 20. And hereby, the urine leaking out to the front side of the tray 30 can be restrained.

Figure 9:
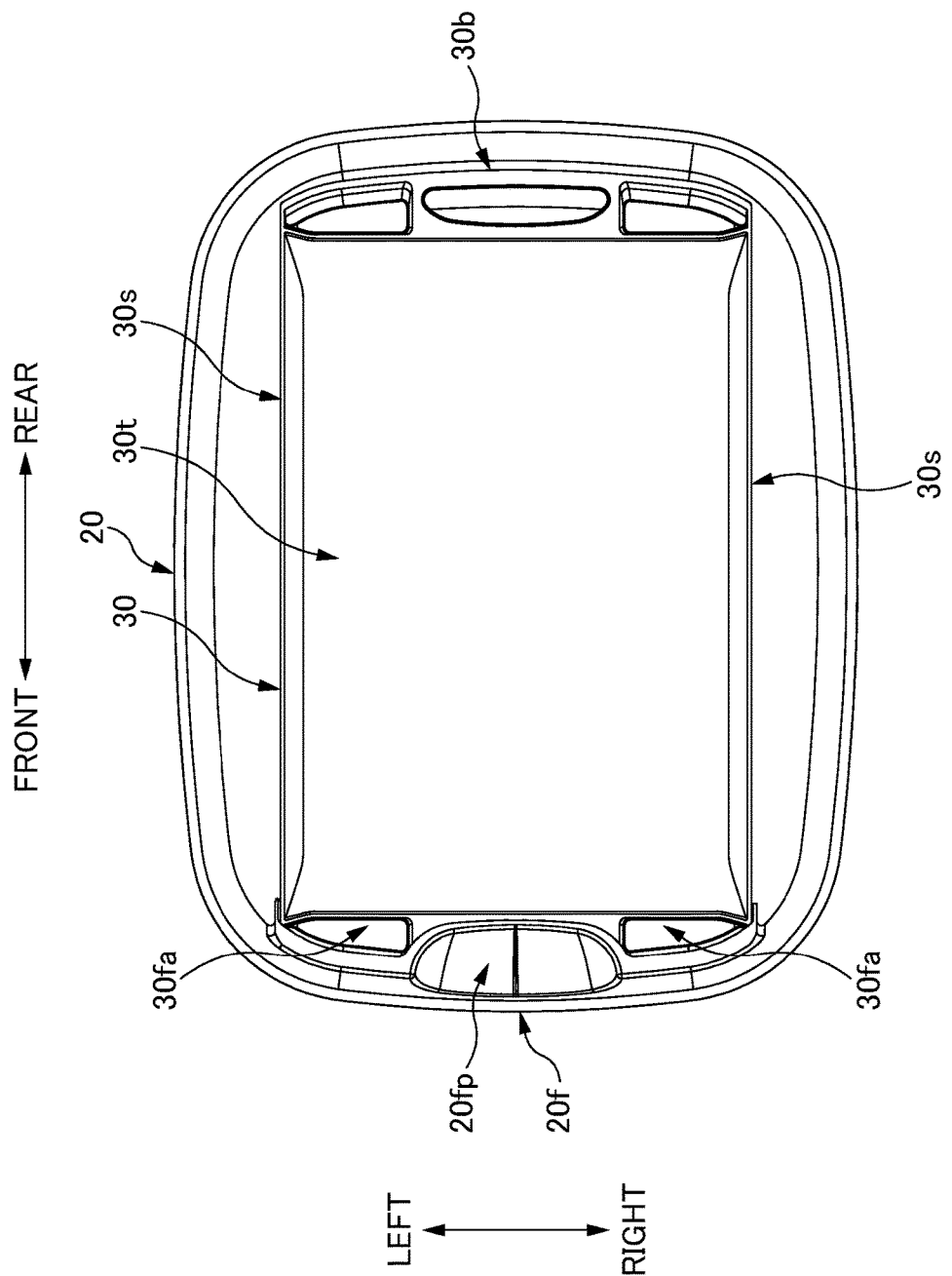
FIG. 9 is a schematic planar view of the lower container 20 housing the tray 30.

Further, as illustrated in the schematic planar view in FIG. 9, the above described spaces 30*fa*, 30*fa* with bottom faces are positioned in the lower container 20 when the tray 30 is in a state housed in the lower container 20. Therefore, when a fragrant or a deodorant is contained in this space 30*fa*, the fragrant and the like quickly deodorizes inside the lower container 20 the odor coming from the urine stored in the tray 30 inside the lower container 20 to thereby effectively restrain the odor.

However, when the above described space 30*fa* is not used as a space for storing matters, this space does not need to be a space with a bottom. In other words, this space 30*fa* does not have to be surrounded by a wall part from below.

Further as illustrated in FIG. 7A, this example adopts a structure same as the aforementioned front wall part 30*f* for the rear wall part 30*b* in order to allow the tray 30 to be exchanged in the front-rear direction. In other words, this rear wall part 30*b* also has formed the aforementioned handle part 30*bg*, a through hole 30*bgh* as the geometrically deformed portion, spaces 30*ba*, 30*ba* having bottoms and the like. However, it is not limited to such. In other words, the rear wall part 30*b* need not be provided with the handle parts 30*bg* and the like.

By the way, description was given above with reference to FIG. 5 that the front wall part 20*f* of the lower container 20 has formed a concave face 20*fk* concaved rearward adjacent above the insert hole 20*fh*. In addition to this, a protruding face 20*fp* protruding rearward is formed, to oppose the bottom face of the upper container 10, toward the rear of the concave face 20*fk* accompanied by the concave deformation toward the rear of this concave face 20*fk*, as illustrated in FIG. 4C.

And in this example, the protruding face 20*fp* is positioned in front of the absorbent sheet placing area A30 on the tray 30 or positioned in front of the mesh area 10*tm* of the upper container 10. And hereby, the above described protruding face 20*fp* is positioned in front of all the through holes h, h . . . of the plurality of through holes h, h . . . formed to the mesh area 10*tm*. Therefore, the protruding face 20*fp* is effectively prevented from being getting filthy by the urine falling through these through holes h, h . . . .

Figure 10:
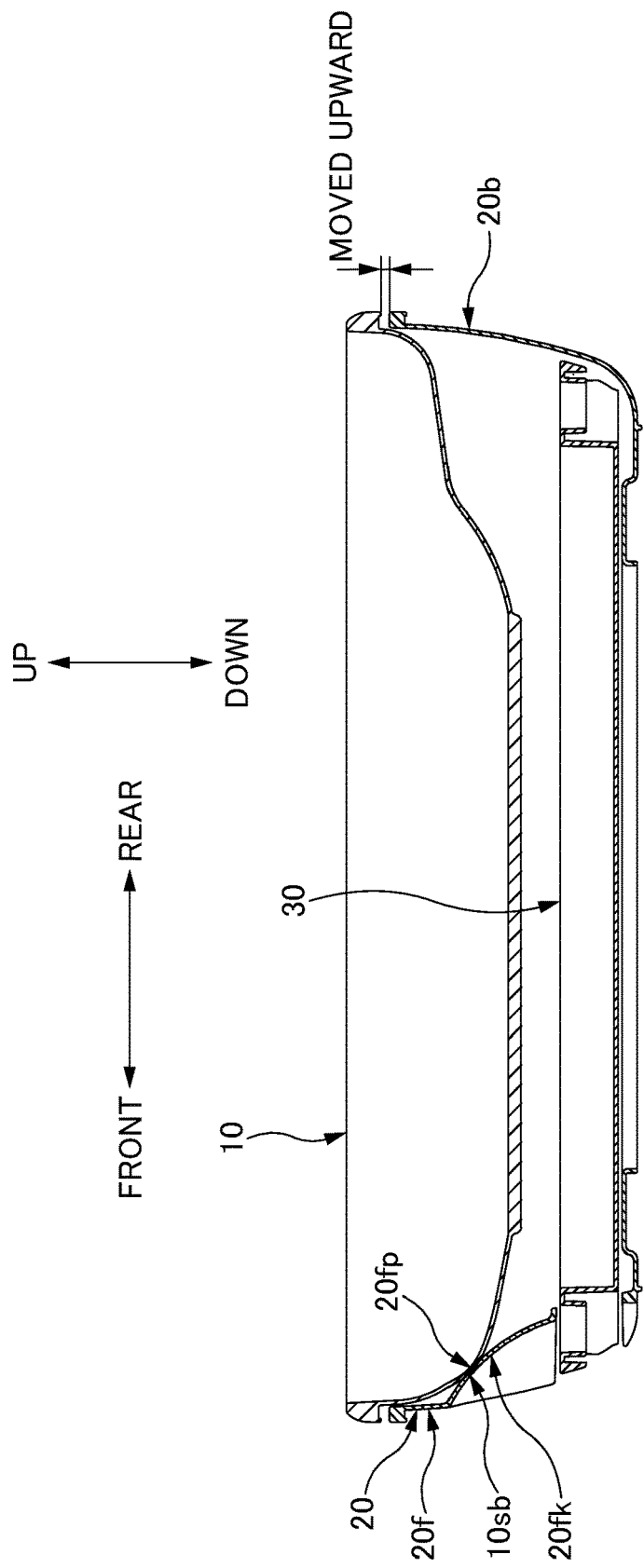
FIG. 10 is a lengthwise sectional view along the approximate center of the upper container 10 directed opposite the orderly direction and placed on the lower container 20.

Note that, this protruding face 20*fp* can possess a foolproof function which can prevent the upper container 10 from being placed on the lower container 20 in the opposite direction by mistake. In other words, when the upper container 10 is placed in the orderly direction along the front-rear direction as illustrated in FIG. 4C, the upper container 10 is placed and supported on the lower container 20 in an appropriate placing state where the upper container 10 and the protruding face 20*fp* not coming into contact with each other whereas when the upper container 10 is placed reverse this orderly direction as illustrated in FIG. 10, the bottom face 10*sb* of the upper container 10 would come into contact with the above described protruding face 20*fp* so that the upper container 10 would be in a state positioned above the above described appropriate placing state. Hereby, a worker that has seen such state would notice right away that the upper container 10 is placed in the opposite direction by mistake.

And in this example, the bottom face part 10*t* of the upper container 10 is provided with a portion 10*tf*1 that functions as the so-called "shakeout." Details are as follows.

Figure 11:
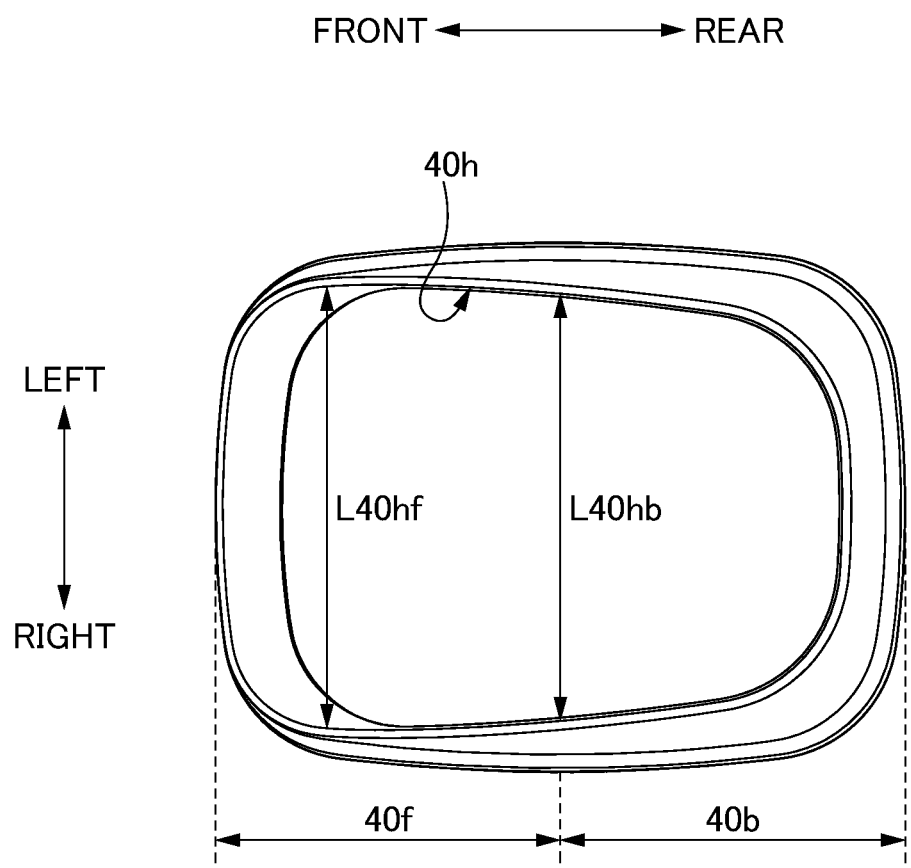
FIG. 11 is a schematic planar view of the cover 40.

Firstly, this animal toilet 1 is designed such that an animal basically comes in from the front side and goes out from the front side. In other words, in the schematic planar view of the cover 40 of FIG. 11, when comparing the upper end edge width of the entrance/exit opening part 40*h* formed to this cover 40 at the front half part 40*f* and the rear half part 40*b* of the cover 40, the maximum horizontal width value L40*hf* at the front half part 40*f* is made larger than the maximum horizontal width value L40*hb* at the rear half part 40*b*. Therefore, an animal goes into the animal toilet 1 mainly from the front side and comes out from the front side.

Meanwhile, as has been described, the above described particulate matters (not shown) are placed on the mesh area 10*tm* of the bottom face part 10*t* of the upper container 10 of FIG. 4A. Therefore, when the animal that has urinated in the animal toilet 1 comes out from the front side of the upper container 10, the animal would usually walk on the front portion 10*tf* of the bottom face part 10*t* of the upper container 10 with the above described particulate matters or their fragments stuck on its feet and come out of the animal toilet 1.

Here, when this front side portion 10*tf* is further divided into the frontage side portion 10*tf*1 and the hind side portion 10*tf*2 as illustrated in FIGS. 4A and 4B, the above described protruding face 20*fp* of the lower container 20 is positioned to come under the former frontage side portion 10*tf*1. Therefore, this frontage side portion 10*tf*1 is positioned higher than the hind side portion 10*tf*2 so that this frontage side portion 10*tf*1 does not interfere with the protruding face 20*fp*. In other words, there is a ramp part 10*tfd* at the border between the frontage side portion 10*tf*1 and the hind side portion 10*tf*2. Further, since this frontage side portion 10*tf*1 being high and not having the aforementioned particulate matters placed, it is unlikely that the particulate matters are accumulated thereto. Therefore, an animal can quickly drop off particulate matters and the like when the animal that has urinated is walking on this frontage side portion 10*tf*1.

By the way, although polyolefin base thermoplastic resin such as polyethylene, polypropylene, polyethylene terephthalate and the like can be given as examples of the material used for the upper container 10, the lower container 20, the tray 30 and the cover 40, it is not limited to such. For example, resin other than the above may do or metal plates such as stainless steel plates, aluminum plates and the like may do.

Further, as an example of an absorbent sheet, one that includes a liquid permeable top side sheet that is placed on the upper side forming the top face, a liquid impermeable bottom side sheet that is placed below the top side sheet to form the lower side of the absorbent sheet and an absorbent body which is interposed between the two sheets can be given. By the way, a liquid absorbent material such as pulp fiber, high-absorbent polymer and the like formed into a predetermined shape such as a rectangular planar shape can be given as an example of the absorbent body, a nonwoven fabric and the like can be exemplified as the top side sheet and a resin film and the like can be exemplified as the bottom side sheet.

===Other Embodiments===

Hereinabove, embodiments of the present invention have been described, however, the foregoing embodiments are intended to facilitate the understanding of the present invention but not to limit the invention. And it is needless to say that modifications and improvements of the present invention are possible without departing from the scope of the invention, and equivalents thereof are also encompassed by the invention. For example, the following modifications are possible.

In the aforementioned embodiment, the animal toilet 1 included a cover 40 as illustrated in FIG. 2, however, it is not limited to such and the cover 40 may be eliminated.

In the aforementioned embodiment, the particulate matters such as cat litter was placed on the bottom face part 10*t* of the upper container 10, however, it is not limited to such and the particulate matters may be eliminated.

Figure 12:
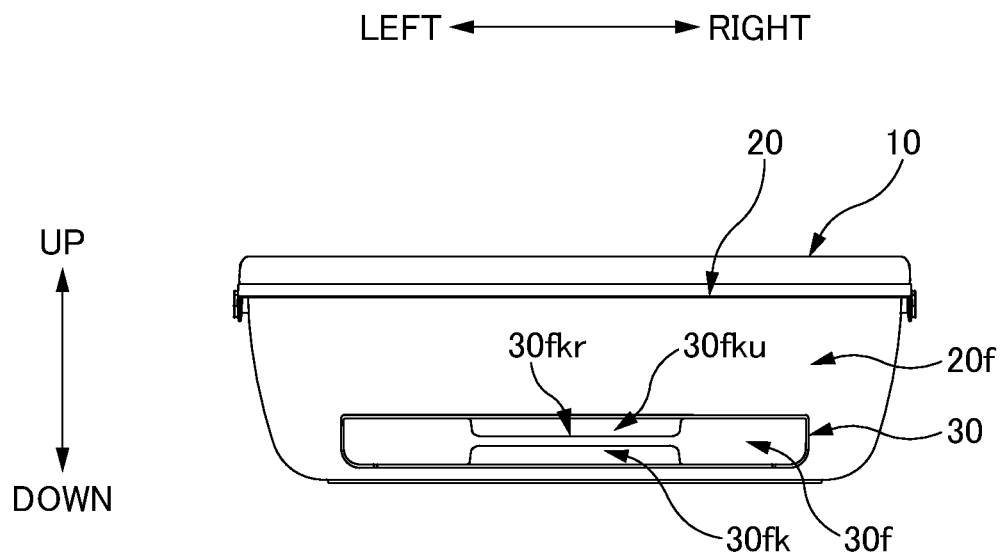
FIG. 12 is a schematic front view of the animal toilet 1 according to another embodiment in a state with the cover 40 taken off.

In the aforementioned embodiment, the front face part 20*f* of the lower container 20 had formed a concave face 20*fk* adjacent above the insert hole 20*fh* for the purpose of exposing to the outside space the upper side of the handle part 30*fg* on the front face part 30*f* of the tray 30 as illustrated in FIG. 4C, however, it is not limited to such. In other words, a configuration other than the above may do as long as the handle part 30*fg* has its upper side exposed to the outside space. For example, as illustrated in the schematic front view of FIG. 12, when a rearward recessed recess part 30*fku* is formed to the upper part of the front wall part 30*f* of the tray 30 and the portion 30*fr* remaining below this recess part 30*fku* is made the handle part 30*fg*, the upper side of this handle part 30*fg* would also be in a state exposed to the outside space, and therefore such may do.

REFERENCE SIGN LIST 1 animal toilet, 10 upper container, 10*t* bottom face part, 10*tf* portion (surrounding area), 10*tf*1 frontage side portion, 10*tf*2 hind side portion, 10*tfd* ramp part, 10*tb* surrounding area, 10*ts* surrounding area, 10*tm* mesh area, 20 lower container, 20*f* front wall part (front face), 20*b* rear wall part, 20*s* side wall part, 20*t* bottom face part, 20*fh* insert hole, 20*fk* concave face, 20*fp* protruding face, 20*th* opening part, 30 tray, 30*f* front wall part (front part), 30*fs* inner wall face, 30*fa* hole (space), 30*fg* handle part (portion, exposed portion), 30*fgh* through hole (changed shape portion), 30*fgk*1 recessed part (changed shape portion), 30*fgk*2 recessed part (changed shape portion), 30*fk* recessed part, 30*fp* portion, 30*fr* portion, 30*fku* recess part, 30*b* rear wall part, 30*bs* inner wall face, 30*ba* space, 30*bg* handle part, 30*bgh* through hole, 30*s* side wall part, 30*ss* inner wall face, 30*t* bottom face part, 40 cover, 40*f* front half part, 40*b* rear half part, 40*h* entrance/exit opening part, h through hole, A30 placing area, C10*t* plane center position, C10*tm* plane center position

The invention claimed is:

1. An animal toilet having a front-rear direction, a right-left direction and an up-down direction that intersect each other comprising:
    an upper container that is provided with a plurality of holes through which urine passes below;
    a lower container having a front face which lower container is positioned below the upper container and has an insert hole formed the front face; and
    a tray that is removably received through the insert hole into the lower container and configured to receive and store urine that falls through the plurality of holes of the upper container,
    the tray being configured so that when the tray is received into the lower container though the insert hole a front part of the tray does not protrude outward beyond the front face of the lower container as seen in the right-left direction,
    the front part of the tray having an exposed portion that is exposed outside of the lower container from above and below for access when the tray is received in the lower container, and
    an upper part and a lower part of the exposed portion each being respectively provided with a geometrically deformed portion having a shape that is different from a surrounding portion,
    wherein
    the geometrically deformed portion of the upper part is a recessed part that is recessed downward
    the geometrically deformed portion of the lower part is a recessed part that is recessed upward,
    the recessed part of the upper part and the recessed part of the lower part communicate with each other in the up-down direction to form a through hole,
    the tray has an absorbent sheet placing area for receiving an absorbent sheet that receives and absorbs the urine that falls through the holes of the upper container, and
    a portion in front of the absorbent sheet placing area of the tray and on a right side of the geometrically deformed portion, has a right compartment partitioned and surrounded by wall parts in four directions of a front, a rear, a right and a left,
    a portion in front of the absorbent sheet placing area of the tray and on a left side of the geometrically deformed portion, has a left compartment partitioned and surrounded by wall parts in four directions of a front, a rear, a right and a left,
    a wall part among the wall parts of the right compartment is positioned between the right compartment and the through hole,
    a wall part among the wall parts of the left compartment is positioned between the left compartment and the through hole, and
    the right compartment and the left compartment are closer to the absorbent sheet placing area than the through hole.

2. An animal toilet according to claim 1, wherein
the geometrically deformed portion of the upper part is a recessed part that is recessed downward and
the geometrically deformed portion of the lower part is a recessed part that is recessed upward.

3. An animal toilet according to claim 2, wherein
the recessed part of the upper part and the recessed part of the lower part communicate with each other in the up-down direction to form a through hole.

4. An animal toilet according to claim 1, wherein the front face of the lower container has formed a concave face concaved rearward adjacent above the insert hole.

5. An animal toilet according to claim 4, wherein
a protruding face protruding rearward accompanied by the rearward concave deformation of the concave face is formed, to oppose a lower face of the upper container, at the rear of the concave face and
the protruding face is positioned in front of all of the plurality of holes.

6. An animal toilet according to claim 4, wherein
the tray has an absorbent sheet placing area for holding an absorbent sheet that receives and absorbs the urine that falls through the holes of the upper container,
a protruding face protruding rearward accompanied by the rearward concave deformation of the concave face is formed, to oppose a lower face of the upper container, at the rear of the concave face, and
the protruding face is positioned in front of the absorbent sheet placing area in the tray.

7. An animal toilet according to claim 4, wherein
a protruding face protruding rearward accompanied by the rearward concave deformation of the concave face is formed, to oppose a lower face of the upper container, at the rear of the concave face,
the upper container is placed and supported on the lower container in an appropriate placing state where the upper container does not come into contact with the protruding face, when the upper container is placed in an orderly direction along the front-rear direction, and
the upper container positioned above the appropriate placing state is in an inappropriate placing state when the upper container is positioned in a direction opposite the orderly direction with regard to the front-rear direction by the upper container coming into contact with the protruding face of the lower container.

8. An animal toilet according to claim 4, wherein
a front side of the upper container is an entrance/exit opening for an animal to go into/come out from the upper container,
a plurality of particulate matters are placed on a bottom face of the upper container,
a protruding face protruding rearward accompanied by the rearward concave deformation of the concave face is formed at the rear of the concave face,
a portion positioned above the protruding face of the upper container includes a part with a level difference on an upper face,
two portions positioned different from each other in the up-down direction are adjacent in the front-rear direction via the part with the level difference,
a front portion among the two portions is positioned above a rear portion in the up-down direction, and
the front portion does not have the particulate matters placed.

9. An animal toilet according to claim 1, wherein
the tray has an absorbent sheet placing area for holding an absorbent sheet that receives and absorbs the urine that falls through the holes of the upper container, and
portions in front of the absorbent sheet placing area in the tray and on two sides on a right and a left of the geometrically deformed portion, respectively have a space partitioned and surrounded by wall parts in four directions of a front, a rear, a right and a left.

10. An animal toilet according to claim 9, wherein
the space being surrounded by a wall part from also below is a space with a bottom and has only an upper side opened.

11. An animal toilet according to claim 10, wherein
the space with the bottom is positioned in the lower container when the tray is in a state housed in the lower container and
the space with the bottom contains a fragrant or a deodorizer.

\* \* \* \* \*